United States Patent Office 3,842,012
Patented Oct. 15, 1974

3,842,012
METHOD OF MANUFACTURING AN OXIDE OF YTTRIUM AND/OR LANTHANUM AND/OR THE LANTHANIDES
Johannes Josephus Marie Hoppenbrouwers, Emmasingel, Eindhoven, Netherlands, assignor to U.S. Philips Corporation, New York, N.Y.
No Drawing. Filed Dec. 14, 1972, Ser. No. 314,942
Claims priority, application Netherlands, Dec. 27, 1971, 7117857
Int. Cl. C09k 1/10
U.S. Cl. 252—301.4 R                                  7 Claims

ABSTRACT OF THE DISCLOSURE

In a method of manufacturing an oxide of at least one of the elements yttrium, lanthanum and the lanthanides the starting material is a mixture of oxides of at least one of the said elements and between 0.1 and 2 mol of oxide of one or more of the alkali metals sodium, potassium, rubidium and cesium per mol of the said oxides. The mixture is heated at a temperature of between 1000 and 1400° C.

Satisfactorily crystallized coarse-grained oxides, particularly luminescent oxides are obtained by this method.

---

The invention relates to a method of manufacturing an oxide of at least one of the elements yttrium, lanthanum and the lanthanides. The invention particularly relates to a method of manufacturing a luminescent oxide of yttrium and/or gadolinium and/or lanthanum and furthermore to the oxides manufactured by the said method.

It is known that the oxides of yttrium and/or gadolinium and/or lanthanum activated by one or more of the rare earth metals constitute satisfactorily luminescent materials. Interest is especially focussed on the oxides activated by trivalent europium because they have a very efficient line emission in the red part of the visible spectrum when they are excited by electrons so that they are particularly suitable for use as a red component in the display screen of colour television tubes. The oxides activated by trivalent europium may likewise be used in combination with gas discharge lamps because they can also be satisfactorily excited by ultraviolet radiation with substantially the same emission as for electron excitation.

Luminescent oxides or yttrium and/or gadolinium and/or lanthanum are generally manufactured by heating a mixture of compounds of yttrium and/or gadolinium and/or lanthanum and of the activator element in an oxidizing atmosphere. In many cases the starting materials are the oxides of the said elements, but it is alternatively possible to form a mixed compound of these elements, for example, the mixed oxalate, whereafter this mixed compound is converted into the oxide by heating.

The luminescent oxide manufactured in this manner consists of a polycrystalline powder. To obtain satisfactorily luminescent materials it is necessary that the number of lattice errors in the crystals is as small as possible and that the activator is satisfactorily incorporated in the crystal lattice. Furthermore it is required for most uses that the grain dimensions and the grain shape of the luminescent powder satisfy given conditions. In order to cause the formation reaction to proceed better during manufacture of the luminescent oxides and to improve the crystallinity of the product obtained, it is known to heat the starting materials in the presence of the melting salt.

U.K. Paent Specification 1,110,290 describes, for example, the use of ammonium chloride and metal chlorides as a melting salt in the manufacture of yttrium and/or gadolinium oxide activated by trivalent europium. U.K. Patent Specification 1,127,166 describes the use of fluorides of alkali and alkaline earth metals and of borax. U.S. Patent Specification 3,368,980 describes the use of alkaline earth halides together with $SiO_2$. Netherlands Patent Application 7016705 describes a method of manufacturing gadolinium oxide crystals in which gadolinium may be entirely or partly replaced by yttrium and in which lithium oxide or compounds which produce lithium oxide upon heating are used as a melting salt.

It has been found that when using the said melting salts the formation reaction of the oxide is accelerated, but that a favourable influence on the crystallinity and crystal shape is obtained to a limited extent only. Furthermore a drawback of the known melting salts is that they can be used to a limited extent only. It has been found that, for example lithium oxide is less suitable as a melting salt for the manufacture of yttrium oxide crystals because lithium yttrate may be formed.

The object of the invention is to provide a method of manufacturing the oxides of yttrium and/or lanthanum and/or the lanthanides in which the above-mentioned drawbacks do not occur and in which very satisfactorily crystallized oxide grains are obtained.

According to the invention a method of manufacturing an oxide of at least one of the elements yttrium, lanthanum and the lanthanides is characterized in that a mixture is made comprising oxide of at least one of the elements yttrium, lanthanum and the lanthanides and furthermore per mol of the said oxides between 0.1 and 2 mol of oxide of at least one of the alkali metals sodium, potassium, rubidium and cesium or compounds which can produce the said quantity of alkali metal oxide upon heating, and that the mixture is heated at a temperature of between 1000 and 1400° C.

In a method according to the invention the starting material is an oxide or possibly a mixed oxide of the elements yttrium and/or lanthanum and/or the lanthanides. This starting material consists of a polycrystalline powder whose particles have an average size of, for example, 2μ. These particles consist, however, of conglomerates of large numbers of very fine microcrystals. In a method according to the invention the oxide is converted into a satisfactory crystalline powder whose means particle size may be a factor of 2 larger than that of the starting material and in which the individual particles are found to be substantially single crystals. According to the invention the starting material is to this end mixed per mol of oxide with between 0.1 and 2 mol of oxide of at least one of the alkali metals sodium, potassium, rubidium or cesium or with compounds which can produce the said quantity of alkali metal oxide upon heating. The mixture thus formed is heated at a temperature of between 1000 and 1400° C. in which recrystallization of the starting material is effected. The heat treatment may be performed in air. The quantity of alkali metal oxide to be added is to be chosen to be between the above-mentioned limits. In fact, when less than 0.1 mol of alkali metal oxide per mol of the starting material is used, an insufficient recrystallization and crystal growth is obtained. The crystal size of the final product increases as the quantity of alkali metal oxides increases. The use of more than 2 mol of alkali metal oxide per mol of the starting material is, however, undesirable because generally no further increase of the mean grain size is obtained.

In a method according to the invention sodium and/or potassium carbonate in a quantity of between 0.4 and 2 mol per mol of oxide of yttrium, lanthanum and the lanthanides is preferably used as the alkali metal oxide source. These carbonates are cheap and available in a very pure form.

In a preferred embodiment of a method according to the invention sulphur is furthermore used in the mixture to be heated. It has surprisingly been found that sulphur, even in very small quantities, results in a considerable further increase of the crystal size. The quantity of sulphur may be chosen to be within wide limits. For a quantity of 0.001 mol of sulphur per mol of oxide of yttrium, lanthanum and the lanthanides a noticeable effect of the sulphur addition is already obtained. When using large quantities of sulphur the growth of the grains decreases, however. Consequently not more than 1.50 mol of sulphur per mol of the starting material is used.

Quantities of sulphur of between 0.01 and 0.30 mol per mol of the starting material are preferred. A grain size of the final product can then be obtained which is a factor of 10 larger than that of the starting material and in which the particles are substantially monocrystalline.

The duration of heating the mixture may be chosen to be within wide limits and is dependent *inter alia* on the heating temperature and on the quantity of the mixture to be heated. Heating periods of between 2 and 16 hours for a heating temperature of between 1100 and 1200° C. are preferred.

It is generally desirable to wash the product obtained after cooling, for example, to wash it with water in order to release the product from alkali metal compounds, and to subsequently dry it.

A method according to the invention is preferably used for the manufacture of a luminescent oxide defined by the formula $M'_{2-x}M''_xO_3$ in which $M'$ represents at least one of the elements yttrium, gadolinium and lanthanum and $M''$ represents at least one of the elements europium, terbium and cerium and in which $0.0002 \leq x \leq 0.2$. Such a method has the advantage that a luminescent oxide is obtained with which greater brightnesses can be obtained as compared with the oxides manufactured in known manner. Furthermore the oxides manufactured by a method according to the invention have the advantage that they have better application properties so that they can better be provided, for example, on the screen of a cathode-ray tube. As a result of the satisfactory crystallinity and the large crystal dimensions the unwanted interaction between the luminescent oxides according to the invention and the photosensitive suspension is substantially excluded.

The invention will now be further described with reference to a number of examples and measurements.

EXAMPLE 1

A mixture is made of 400 grammes of $Y_{1.905}Eu_{0.095}O_3$ and 240 grammes of $Na_2CO_3$. The mixed oxide used as a starting material has a mean grain size of approximately $1\mu$. The separate grains consist of agglomerates of microcrystals (primary grain size $<0.1\mu$). The mixture is heated in air in a furnace for 4 hours at a temperature of 1180° C. After cooling the product obtained is pulverized, washed with water and dried. The powder thus obtained is a luminescent europium-activated yttrium oxide defined by the same formula as the starting material and consists of substantially monocrystalline particles having a mean primary grain size of approximately $2\mu$.

EXAMPLES 2 TO 7 INCLUSIVE

The method of Example 1 is repeated several times in which, however, different quantities of sulphur are also added to the mixture. Table I below shows the quantities of sulphur used for the examples 2 to 7 inclusive, as well as the primary grain size $d_p$ of the product obtained for each example. Furthermore Table I states the relative brightnesses H is arbitrary units of the luminescent oxides obtained upon excitation by electrons in a cathode-ray tube which can be disassembled.

TABLE I

| Example | Quantity S in grams | $d_p$ in $\mu$ | Relative brightness H |
|---|---|---|---|
| 2 | 8 | 2.2 | 129 |
| 3 | 16 | 2.5 | 135 |
| 4 | 24 | 2.8 | 137 |
| 5 | 32 | 3.8 | 140 |
| 6 | 40 | 3.8 | 135 |
| 7 | 80 | 14.0 | 117 |

The luminescent oxides obtained in accordance with Examples 1 to 7 inclusive yield brightnesses varying between 53 and 62 Nt upon electron excitation after they are provided in cathode-ray tubes.

EXAMPLE 8

A mixture is made of 30 grammes of $Y_{1.905}Eu_{0.095}O_3$ and 23.4 grammes of $K_2CO_3$. The mixed oxide used has the same properties as the starting material used in Example 1. In the same manner as in Example 1 the mixture is subjected to a temperature treatment. The product obtained has a primary grain size of $2.1\mu$.

EXAMPLE 9

Operations are carried out analogously as in Example 8 in which the mixture comprises 12 grammes of mixed oxide and 15.7 grammes of $Rb_2CO_3$. The primary grain size of the product obtained is $1.7\mu$.

EXAMPLE 10

30 grammes of $Y_{1.095}Eu_{0.095}O_3$ are mixed with 55.2 grammes of $Cs_2CO_3$. Subsequently the same operations as mentioned in Example 1 are performed. The primary grain size of the product obtained is approximately $10\mu$.

EXAMPLE 11

19.35 grammes of $La_2O_3$, 0.65 gramme of $Eu_2O_3$ and 20 grammes of $Cs_2CO_3$ are mixed. Subsequently a temperature treatment as described in Example 1 is performed. The product obtained comprises a luminescent europium-activated lanthanum oxide whose primary grain size is $4\mu$.

EXAMPLE 12

A mixture of 100 grammes of $Eu_2O_3$ consisting of conglomerates of microcrystals having a primary grain size of less than $0.1\mu$ and 60 grammes of sodium carbonate is heated in the same way as described in Example 1. The $Eu_2O_3$ obtained consists of a monocrystalline powder having a primary grain size of approximately $5\mu$.

What is claimed is:

1. A method of preparing a monocrystalline oxide of increased particle size of at least one element selected from the group consisting of yttrium, lanthanum and the lanthanides comprising preparing a mixture of a polycrystalline powder of at least one of said oxides and from 0.1 to 2 mol per mol of said oxides of at least one carbonate of an alkali metal selected from the group consisting of sodium, potassium, rubidium and cesium and heating said mixture at a temperature of about 1000° C. to 1400° C.

2. The method as claimed in Claim 1, wherein the mixture comprises at least one carbonate selected from the group consisting of sodium and potassium carbonate in a quantity of between 0.4 and 2 mol per mol of oxide of yttrium, lanthanum and the lanthanides.

3. A method as claimed in Claim 2, wherein the mixture furthermore comprises sulphur in a quantity of between 0.001 and 1.50 mol per mol of oxide of yttrium, lanthanum and the lanthanides.

4. A method as claimed in Claim 3 wherein the quantity of sulphur is between 0.01 and 0.30 mol per mol of oxide of yttrium, lanthanum and the lanthanides.

5. A method as claimed in Claim 2 wherein the heat treatment is effected for 2 to 16 hours at a temperature of between 1100 and 1200° C.

6. A method as claimed in Claim 5 wherein the product obtained after cooling is washed free from alkali metal compounds and is subsequently dried.

7. A method as claimed in Claim 5 wherein said monocrystalline oxide is a luminescent oxide defined by the formula $M'_{2-x}M''_xO_3$ in which M' represents at least one of the elements selected from the group consisting of yttrium, gadolinium and lanthanum and M'' represents at least one of the elements selected from the group consisting of europium, terbium and cerium, and in which $0.002 \geq x \geq 0.2$.

References Cited
UNITED STATES PATENTS

| | | | |
|---|---|---|---|
| 3,717,584 | 2/1973 | Byler et al. | 252—301.4 |
| 3,582,493 | 6/1971 | Haynes et al. | 252—301.4 |
| 3,684,730 | 8/1972 | Sobon | 252—301.4 |
| 3,574,131 | 4/1971 | Ferri et al. | 252—301.4 |
| 3,721,630 | 3/1973 | Mehalchick et al. | 252—301.4 |
| 3,562,175 | 2/1971 | Hickok | 252—301.4 |
| 3,458,450 | 7/1969 | Kobayashi et al. | 252—301.4 |
| 3,650,975 | 3/1972 | Yale | 252—301.4 |

JACK COOPER, Primary Examiner

U.S. Cl. X.R.

23—305; 423—263